W. Zimmerman,
Wind Wheel,
N°18,368. Patented Oct. 6, 1857.
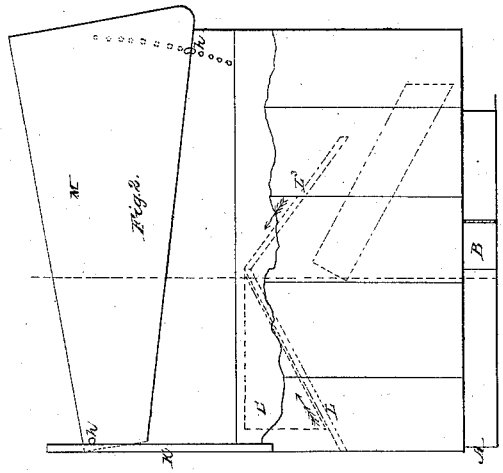
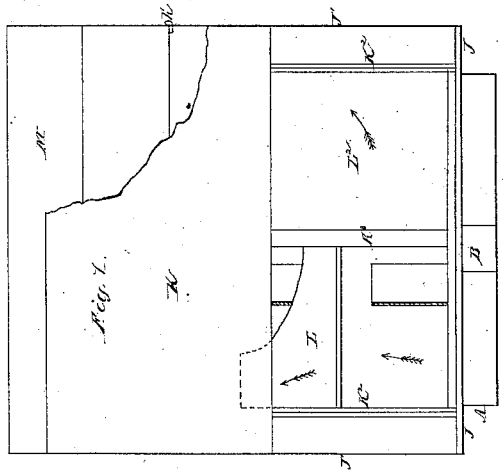
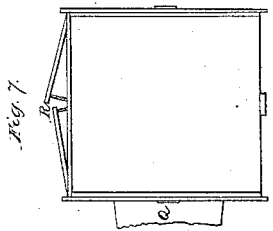
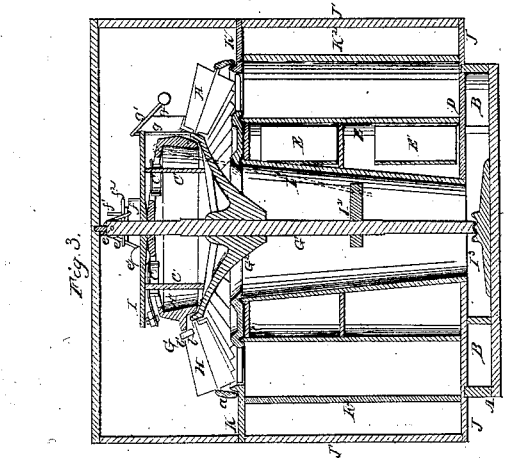
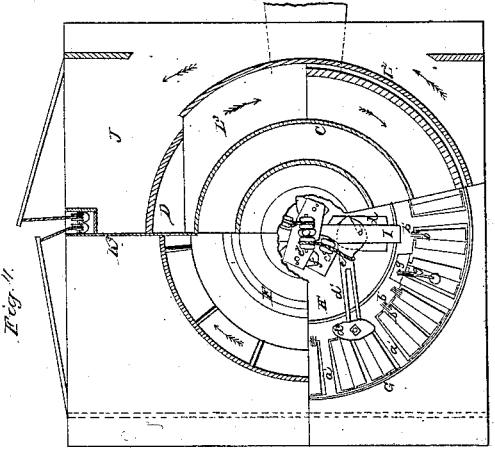

UNITED STATES PATENT OFFICE.

WILLIAM ZIMMERMAN, OF QUINCY, ILLINOIS.

IMPROVED WINDMILL.

Specification forming part of Letters Patent No. 18,368, dated October 6, 1857.

*To all whom it may concern:*

Be it known that I, WILLIAM ZIMMERMAN, of Quincy, in the county of Adams and State of Illinois, have invented a new and useful reacting wind-wheel, with devices arranged to govern the motion thereof accurately; and I do hereby declare that the same is described, and represented in the following specification and drawings.

To enable others skilled in the art to make and use my invention, I will proceed to describe its construction and operation, referring to the drawings, in which the same letters indicate like parts in each of the figures.

Figure 1 is a front elevation of the mill or wheel house. Fig. 2 is a side elevation of same. Fig. 3 is a sectional elevation of the wheel and house through the line $z\,z$, Fig. 2. Fig. 4 is a plan of the wheel and house with the roof removed, showing a portion of the wheel and the house below the wheel. The other figures will be referred to in the specification.

The nature of my invention and improvements consist in a wind-wheel with radial sails arranged upon an upright shaft and provided with a regulating apparatus to change the position of the sails and adapt them to the force of the wind or the resistance of the machinery operated, and in devices to receive the wind and guide it onto the wheel in the right direction to propel it with the greatest force; also, in a vacuum-escape cap above or around the wheel for the wind to pass through out of the wheel; also, in arranging some doors at the rear of the wheel-house closed by a weight or spring, so as to yield and open for the surplus wind in the wheel-house to escape, and in some revolving wind receivers or catchers provided with flues to conduct the wind caught to the wheel-house.

In the accompanying drawings, A is the base of the mill, made circular, of wood, metal, or masonry, either in or above the ground, and provided with openings B B for the wind to enter from the pipes of the wind-catchers, as will be hereinafter described.

The wheel or mill house (shown in Figs. 1 and 2) is arranged to turn on the base A around the circular house E, and may be provided with rollers so arranged as to lessen the friction in turning so as to keep the front constantly to the wind with facility.

The base A is covered with a floor D, except the opening shown in the middle, and upon this floor the circular wall or case E is built with openings or doors E' E', as shown in the drawings, Fig. 3. Within the case E and around the opening in the floor D the circular case F is made largest at the top to conduct the wind received in the base up to the reacting horizontal wind-wheel G, fastened to the perpendicular shaft G', which shaft may be provided with a pulley or gear to drive the machinery operated by the wheel. The wheel G may be made concave on its upper side and plane or flat or concave on its lower side, as shown in the drawings. The center $G^2$ is an inverted cone fastened to the shaft and is curved slightly to guide the wind which ascends in the case F onto the sails or valves H H. The extremity of the center $G^2$ is connected to the rim $a$ by radial arms $a'\,a'$, made thin and inclined, so as to serve for permanent sails to aid in propelling the wheel. The rim $a$ may be made with inclined scores on one or both sides, as shown by dotted lines, so that the wind which escapes between the rim $a$ and the flange on the floor of the wheel-house just within the rim $a$ may aid in propelling the wheel. The sails H H are provided with pivots in the center of each end, which turn in the edge of the center $G^2$ and the rim $a$. The inner ends of these sails are provided with segment-gears $b\,b$, acted upon by pins or teeth $b'$ in the edge of the central cap H', (see Fig. 4,) which cap is made in the form shown in section, Fig. 3, and fitted to turn freely on the shaft G' when operated by the cams $c\,c$ (see dotted lines in Fig. 4) to change the angle of the sails H H and incline them more or less to the wind passing up through the wheel and regulate its speed by adapting the sails to the force of the wind or the resistance of the machinery propelled by the wheel. The cams $c\,c$ are fastened to the shafts $c'\,c'$, which turn in the arms of the center $G^2$ and in the bar I, fastened to the shaft G' above the central cap. These cams turn the cap H' by acting against the sides of the slots in the cap, one of which is shown at $d$, Fig. 4. There is a slotted arm $d'$ fastened upon the cam $c$, carrying a weight $d^2$. This arm and weight are drawn toward the center of the wheel by the cord $e$, fastened to it and passing under the pulley $e'$ and over the pulley $e^2$ and fastened to the weight $f$, arranged to traverse on the vertical pins $f'$ in the cap.

The operation of this apparatus is as follows: The weight $f$ holds the arms $d'$ and cams $c$ in such a position as to hold the cap H′ and sails H H in the best position for the wind-wheel to turn with the greatest velocity from the wind passing up through it. Should it go faster than is proper, the centrifugal force throws out the weights $d^2$, raising the weight $f$, and turning the cams $c\ c$, which operate the cap H′ and sails H H and turn their edges more to the wind, so that the wind acts on the sails and wheel with less effect, so as not to turn it so fast, and these devices may be so arranged as to turn the sails so that they would retard instead of propelling the wheel, if desired. If the sails are turned so that the motion of the wheel is reduced to its proper speed, the weight $f$ descends and draws in the arms $d'$ and brings the sails more against the wind, and thus the velocity of the wheel is regulated. After the weight $f$ has risen a little it comes to the weight $f^2$, arranged above it, and lifts it, and a series of weights like $f^2$ may be arranged one above another in succession, so as to be lifted one after another as the weight $f$ rises, and such an amount of weight may be added to $f$ as may be deemed necessary to effect the object intended. Friction-rollers may be arranged in the cap H′ or in the wheel under it, to facilitate its turning to regulate the wheel.

If the following method should be preferred for changing the position of the sails and regulating the motion of the wheel, it may be used, to wit: A standard $g$ may be fastened to the center $G^2$, Figs. 3 and 4, having an arm $g'$ hinged at the top, with a ball on the end arranged to swing out radially by centrifugal force, the arm $g'$ being connected to one or more of the sails H by the rod $g^2$, so that the weight of the ball will hold the sail or sails to which it is connected in the best position for the wind to act upon with the greatest force as it passes up through the wheel; but if the wind should turn the wheel too fast the ball will rise by centrifugal force and lift the arm $g'$ so as to turn the edges of the sails H H more to the wind, so that the wind will act on the sails with less force, and thus make the wheel run slower and prevent it from running too fast for the machinery being operated by it. A part or all the apparatus for changing the position of the sails described as being above the wheel may be arranged below it, if preferred. The lever I′, Fig. 3, passes through the cap H′ and through the center $G^2$, which forms its fulcrum, and extends down below the wheel, so that it may be caught and moved to turn the cap H′ to set the sails H H edge to the wind and spring behind the dog $I^2$ on the shaft, so as to hold the sails edge to the wind and allow the wheel to stop.

The wheel-house is represented in the drawings as being made square; but it may be made in such other form as may be preferred that will answer the purpose. The floor J has a circular hole in it corresponding with or fitted onto the base A of the mill, so as to turn freely. The sides J′ J′ are fastened to the floor J and extend up above the wheel, and the bar $J^2$ is fastened to the top of the sides right over the wheel for the upper end of the shaft to turn in. The lower end turns on a step $I^3$, fastened in the center of the base A.

There is a second or upper floor K around the wheel G in the wheel-house (see Fig. 3) just below the lower edge of the wheel, which floor extends entirely over the house, except the opening covered by the wheel. The front of the house below this floor K is provided with a sliding door K′, which may be raised and lowered to graduate the supply of wind to the wheel or closed to shut the wind from the wheel. The floor K is supported by two parallel partitions $K^2$ $K^2$ near each side, which partitions are provided with openings, through which the wind passes to the wheel. There is also a central partition $K^3$ $K^3$, which extends from the front and rear into the circular case E, and the wind which enters at the left of the partition $K^3$ is guided up under the wheel by the incline L, Fig. 1, and dotted lines in Fig. 2, and the wind that enters between the outside and the partition $K^2$ passes through holes L′ L′ in the partition and then up through the wheel. The wind which enters to the right of the central partition $K^3$ passes around between the circular partition $L^2$ and the outside, and is guided up under the wheel by the incline $L^3$ in the right direction to propel the wheel with great force.

The course and direction of the wind in the several figures are indicated by arrows.

The top of the wheel-house is covered with an adjustable vacuum-cap M, arranged on pins passing through the sides J′ of the house and the sides of the cap, one of which pins is shown at $h$, Fig. 2. This cap may be raised and lowered, as desired, and held up by the pins $h'$ inserted in the holes in the sides J′, as shown in the drawings. The wheel-house below this cap and above the floor K is left entirely open for the escape of the wind passing through the wheel, and the wind passing over the cap and by the sides of the wheel-house tends to form a vacuum under the cap, so as to aid materially in drawing the wind through the wheel. This vacuum-cap may be made so large at the rear end that the wheel will turn with considerable force with a very light wind, and the vacuum-cap may be extended as far back at the rear of the mill as may be desired, and the rear end supported by wheels turning on a circular rail around the mill. The rear of the wheel-house below the floor K is closed by the doors N N, which are drawn to by weights on the cords N′ N′, running over pulleys, as shown in the drawings, Fig. 4. These doors are so arranged as to be forced open by the wind, should it blow so hard as to endanger the mill, and let the surplus wind escape without doing any injury. Springs may be applied to close the doors instead of a weight, if preferred.

When this mill is located near hills or high buildings, the house may be so constructed or arranged as to have the wind enter near the top and pass down through the wheel and escape near the bottom of the wheel-house, and when preferred that way the shaft of the wheel may be inclined instead of perpendicular. The wheel-house is represented in the drawings as extending much farther from or beyond the wheel at the rear than it does in front, so as to serve as a vane to keep the front of the mill always face to the wind. If it should prove insufficient, a vane or vanes, or a vane-wheel may be applied and arranged to turn the wheel-house and keep its front to the wind, as desired.

Figs. 5, 6, and 7 represent a revolving branch wind catcher or receiver consisting of a house with an open front, as shown in Fig. 5, which front may be provided with a sliding door like the one applied to the mill-house. This receiver is arranged to turn on the standard P (shown in section, Fig. 6) over the open end of the flue Q, which is arranged to conduct the wind caught by the receiver into the base A of the mill through the openings B, Figs. 1, 2, and 3. This receiver may be provided with a vane to keep it always front to the wind. The revolving wind-catcher is provided with doors R, closed by a weight like those described on the wheel-house. There may be as many of these revolving branch wind-catchers connected to the wheel-house as may be desirable, and they may be arranged at such distances from and in such positions around the wheel-house as may be most convenient, and the flues leading from them to the base A may be arranged either in or above the ground, and made of such materials as may be preferred.

I contemplate that a sufficient number of wind-catchers may be provided to supply the wheel with wind, so as to dispense with the revolving wheel-house, and only use a revolving vacuum-cap over the wheel, and that when the revolving wheel-house is dispensed with the wind may be conducted up through the center of the wheel-house, as described, or up through hollow columns, round or square, in such parts of the mill-house as may be most convenient, or between two circular walls or cases properly arranged for that purpose, so as to dispense with the central opening described.

I believe I have described and represented my invention and improvement so as to enable any person skilled in the art to make and use them. I will now state what I desire to secure by Letters Patent, to wit:

1. A wind-wheel with radial sails arranged upon an upright shaft when provided with the regulating apparatus first described in the foregoing specification or its equivalent.

2. The arrangement of the partitions and inclined guides which conduct the wind received at the front of the wheel-house onto the four quarters or several parts of the wind-wheel, substantially as described.

3. A vacuum-escape cap above or around a wind-wheel, for the purposes set forth, substantially as described, whether made so as enlarge the vacuum area or otherwise.

4. The revolving wind receivers or catchers, with their conducting-flues, for the purpose of catching the wind and supplying it to the wheel, substantially as described.

WILLIAM ZIMMERMAN.

Witnesses:
J. DENNIS, Jr.,
JOHN S. HOLLINGSHEAD.